United States Patent [19]  [11] 3,744,318
Kulesz  [45] July 10, 1973

[54] METHOD AND APPARATUS FOR MEASURING ULTRA-LOW GAS PRESSURES

[76] Inventor: James J. Kulesz, 5335 Glen Ridge, Apt. 2020, San Antonio, Tex. 78229

[22] Filed: Apr. 20, 1972

[21] Appl. No.: 245,898

[52] U.S. Cl. ................................................. 73/399
[51] Int. Cl. ............................................ G01l 21/12
[58] Field of Search ...................... 73/399, 204, 181, 73/27 R

[56] References Cited
UNITED STATES PATENTS
3,489,010  1/1970  Teagon ................................. 73/399
3,534,601  10/1970  Grob .................................... 73/204

Primary Examiner—Donald O. Woodiel
Attorney—Thomas B. Van Poole et al.

[57] ABSTRACT

A thermoelectric cooling device is mounted in a low-pressure chamber having its hot side connected to a heat sink and its cold side connected to the heat absorbing plate of a large area; a thermocouple is connected to the plate; in one method of operation the thermoelectric cooling device is provided with constant current so that the heat absorbing plate is cooled to a lower temperature than the temperature of the gas in the chamber and variations in temperature of the plate are indicative of the pressure in the chamber since molecular heat flow is proportional to pressure; in another method of the invention the current to the thermoelectric cooling device is varied to maintain a constant temperature of the heat absorbing plate with variations in current to the thermoelectric cooling device being indicative of the pressure in the chamber.

10 Claims, 3 Drawing Figures

METHOD AND APPARATUS FOR MEASURING ULTRA-LOW GAS PRESSURES

This invention is in the field of pressure measuring apparatus and method of making such measurements and is specifically directed to methods and apparatus for measuring ultra-low gaseous pressures.

Many different devices have been proposed for measuring low-vacuum pressures with the most convenient device previously known for this purpose being the standard hot wire thermocouple gauge which employs a hot filament heated by electrical current with a thermocouple being connected to the filament to provide an output signal indicative of the temperature of the filament. Since the molecular heat flow from a hot filament in a gaseous atmosphere in a closed chamber is directly proportional to the pressure of the gas in the chamber, the temperature of the filament under any given current flow condition provides an immediate indication of the pressure in the chamber if the current to the filament is maintained constant.

Standard thermocouple gauges of the foregoing type operate quite well from atmospheric pressure down to about $10^{-3}$ torr. However, thermocouple gauges are unable to read lower pressures than $10^{-3}$ torr due to the fact that radiation transfer below such pressure becomes much greater than molecular heat transfer. By way of explanation, thermocouple gauges rely upon molecular heat transfer caused by the heating of individual molecules adjacent the filament by the filament which heated molecules consequently acquire increased kinetic energy which is imparted to other molecules with which they collide. The heat transfer effected by the molecular heat is inversely proportional to the mean freepath for the molecules, (i.e., the average distance each molecule must travel before colliding with another molecule). The mean freepath is inversely proportional to the pressure of the gas. Thus, as the pressure decreases, the mean freepath increases and the molecular heat flow also decreases.

As the mean freepath increases with decreases in pressures, collisions between molecules becomes less likely and the percentage of heat transfer from the hot filament by radiation increases while that transferred by molecular processes decreases. When the pressure reaches approximately $10^{-3}$ torr, conventional thermocouple gauges are unable to provide further readings indicative of the pressure since the heat flowing from the filament has only slight relation to the pressure. For example, a standard thermocouple gauge operating at 150° C in a vacuum chamber at $10^{-3}$ torr, looses about 100 times as much heat by radiation as it does by molecular conduction. For these reasons, the standard hot wire thermocouple gauge cannot function to provide pressure readings below $10^{-3}$ torr.

The subject invention, on the other hand, provides an apparatus and method capable of measuring pressures less than $10^{-4}$ torr. Pressures down to $10^{-6}$ torr have been measured with the invention which is one-thousandth the minimum pressure which can be measured by the conventional hot wire thermocouple gauges. Therefore, it will be seen that the instant invention represents a gigantic improvement over the best of the prior art pressure measuring devices.

Accomplishment of these highly significant results is obtained by the installation in a low pressure chamber of a thermoelectric cooling device capable of providing a cooled surface in proportion to electrical current flowing through the device. The amount of cooling and the consequent temperature of the cooled surface is in proportion to the current flowing through the device and a thermocouple is connected to a heat absorbing plate on the thermoelectric cooling device for measuring the plate temperature. The heat absorbing plate is maintained at a lower temperature than the gas in the chamber and heat consequently flows from the gas to the heat absorbing plate. Since the amount of heat flowing into the cold surface, which is proportional to the pressure, will obviously increase the temperature of the cold surface, it is, therefore, then necessary to vary the current flowing into the thermoelectric cooling device if the temperature of the plate is to remain constant with the amount of current being indicative of the pressure of the gas in the chamber. It should be kept in mind that the amount of heat flowing between the gas and the cold surface is in direct proportion to the pressure and the current flowing to the thermoelectric cooling device is consequently also in proportion to the pressure.

Since radiation flow from any black body is in proportion to the fourth power of the absolute temperature of the body, the radiation loss from the cooled surface is quite insignificant as compared to the previously known hot wire thermocouple gauge in which the wire temperature was usually in the order of at least 150°C. Consequently, radiation flow of heat into and away from the cold surface is substantially reduced with the percentage of flow from the cold surface that is accomplished by molecular activity (conduction) being much greater than is the case with the normal hot wire type thermocouple gauge.

In addition, the inventive apparatus can also be operated by another method to determine the pressure by maintaining current constant to the thermoelectric cooling device while monitoring the temperature of the cold body. The temperature of the cold body will be indicative of the pressure in the chamber and will provide a clear basis for enabling ascertainment of the exact pressure in the chamber.

In either method of operation, it is essential that the thermoelectric cooling device have its hot surface connected to a heat sink for absorbing the heat and conducting the heat away from the thermoelectric cooling device. In the preferred embodiment for practice of the invention, the heat sink comprises a large copper rod to which the hot side of the thermoelectric cooling device is connected. A thin ribbed plate of copper is secured to the cold side of the thermoelectric cooling device with the thermocouple being connected to the thin heat absorbing plate. The large heat sink rod is connected to the walls of the chamber which happen to be metal so that heat entering the heat sink can be conducted through the rod to the walls of the chamber in an obvious manner. A multimeter connected to the thermocouple provides an accurate indication of the temperature of the heat absorbing plate at all times. Current flowing through the thermoelectric cooling device can be measured by any conventional accurate current measuring device for providing an indication of the pressure in the chamber as was described previously. Similarly, the reading of the multimeter connected to the thermocouple can also provide an indication of the pressure in the chamber.

Therefore, it is the primary object of this invention to provide a new and improved low-pressure measuring means.

A still further object of the invention is the provision of new and improved methods of measuring ultra-low pressures.

The manner in which the objects of this invention are achieved will be better understood when the following written description is read in conjunction with the appended drawings in which.

Figure 1:
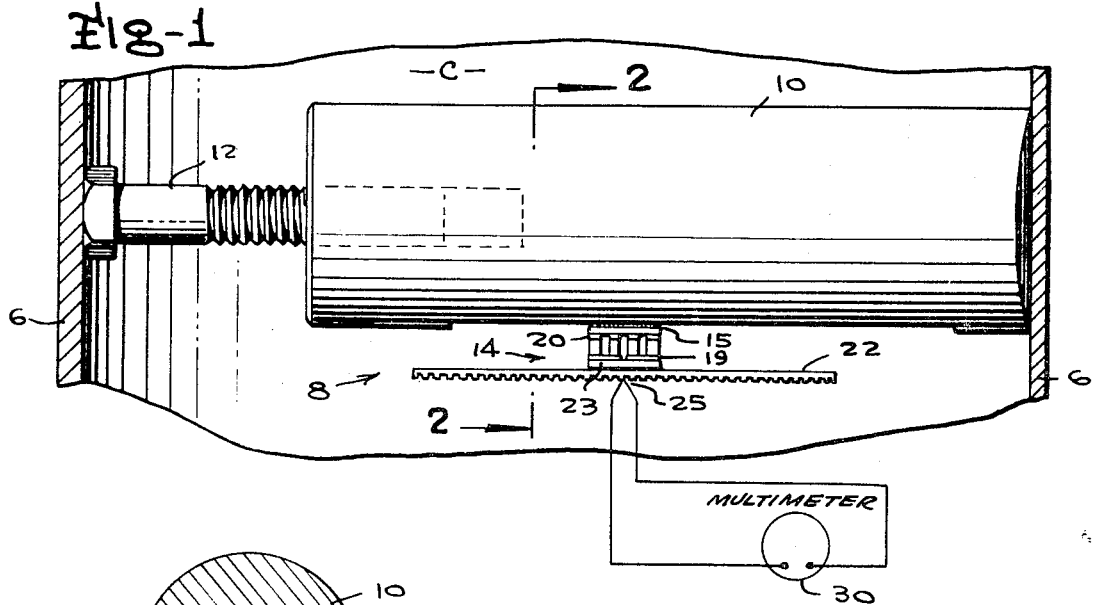
FIG. 1 is a side elevational view of the preferred embodiment of the invention mounted in a test chamber having portions removed for illustrating the operative components.
Figure 2:
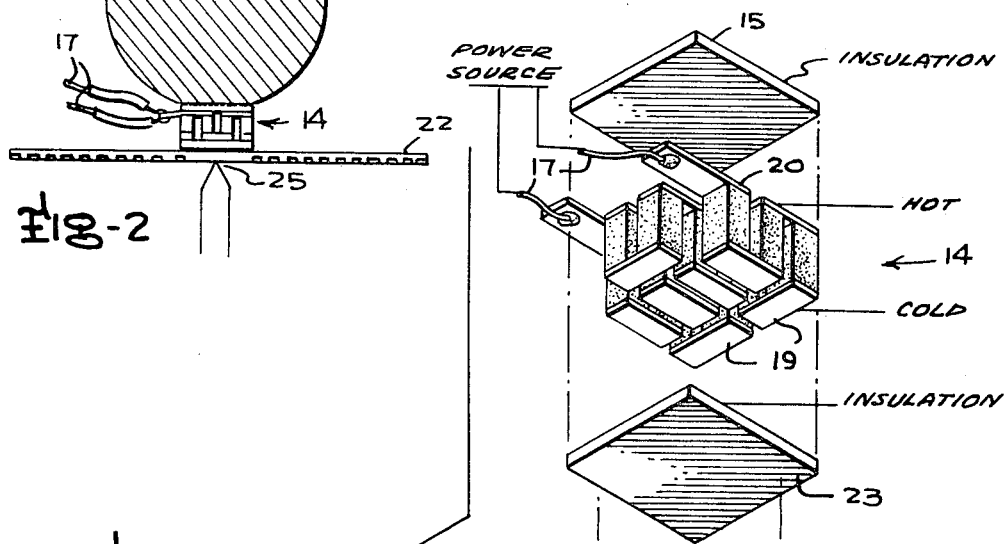
FIG. 2 is a sectional view taken along lines 2—2 of FIG. 1.
Figure 3:
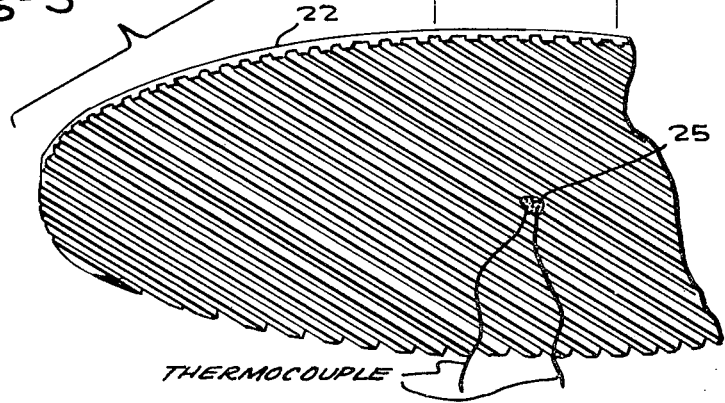
FIG. 3 is an exploded perspective view of the primary components of the preferred embodiment.

Attention is initially invited to FIG. 1 of the drawings which illustrates the wall 6 of a cylindrical test chamber C in which the preferred embodiment, generally designated 8, is mounted. The preferred embodiment comprises a heat sink 10 in the form of an elongated copper rod from which a threaded bolt 12 extends with the rod and bolt being adjusted in an obvious manner to be expanded outwardly against the walls 6 of the chamber for supporting the entire apparatus in the chamber.

A conventional thermoelectric cooling device 14 is connected to the heat sink 10 by means of a thin layer 15 of insulation forming the outer surface of PN junctions of the cooling device. Thermoelectric cooling device 14 as employed in the preferred embodiment is a conventional commercial item manufactured by the Materials Electronic Products Corporation at 990 Spruce Street, Trenton, New Jersey and sold under the series designation MC-3.3. However, other similar thermoelectric cooling devices can be used if desired. In any event, the thermoelectric cooling device includes inlet conductors 17 connected to a source of low voltage, which, when applied to the conductors 17, results in a cold surface 19 and a hot surface 20.

A heat absorbing body in the form of a thin plate 22 having surface corrugations to increase its surface is connected to the cold surface 19 by soldering to a thin layer of insulation 23 and a thermocouple 25 is soldered to the surface of the plate 22 as shown. The output of the thermocouple is connected to a multimeter 30 for providing an indication of the temperature of the plate 22.

In a first method of operation, current is provided to the conductors 17 at a constant current flow which will result in the flow of a given amount of heat through the thermoelectric cooling device to the heat sink 10. The temperature of the plate 22 will vary in accordance with the heat flowing into the plate 22 which is in turn proportional to the pressure in the chamber C. Therefore, the reading of multimeter 30 will provide a direct correlation with the pressure in the chamber and will enable an ascertainment of the exact pressure in the chamber.

Similarly, in a second method of operation, the current flowing through the conductor 17 is varied for maintaining the temperature of plate 22 at a constant level. Such a constant level of temperature for the plate 22 will be ascertained by multimeter 30 and a separate meter (not shown) connected to the power source in circuit with conductors 17 will provide a constant indication of current flowing into the thermoelectric cooling device. The amount of current flowing into the thermoelectric cooling device will be in proportion to the pressure in the chamber and will provide a direct indication of the pressure.

Numerous modifications of the subject invention will undoubtedly occur to those of skill in the art. For example, it is not essential that a thermoelectric cooling device be employed in conjunction with the heat absorbing plate 22 since other cooling means that could be monitored could also be used. The only truly essential characteristic is that some means be provided for cooling the plate 22 to a temperature below the temperature of the gas in the chamber in order to effect heat flow from the gas to the plate 22. Therefore, it should be understood that the spirit and scope of the invention is to be interpreted solely in light of the appended claims.

I claim:

1. Pressure ascertaining means for measuring the pressure of gas in a closed chamber, said pressure ascertaining means comprising a heat absorbing body in said chamber, cooling means engaging said heat absorbing body for cooling said heat absorbing body at a constant rate to a temperature below the temperature of the gas in the chamber whereby the temperature of the heat absorbing body varies as a function of the gas pressure in the chamber and temperature measuring means connected to said heat absorbing body for measuring the temperature of the heat absorbing body to provide a readout indicative of the pressure in the chamber.

2. The invention of claim 1 wherein said temperature measuring means comprises a thermocouple.

3. The invention of claim 2 wherein said cooling means comprises a thermoelectric cooling device.

4. The invention of claim 3 additionally including a heat sink and wherein said thermoelectric cooling device has a hot end connected to said heat sink and a cold end connected to said heat absorbing body.

5. The invention of claim 4 wherein said heat sink comprises a metal body contacting the walls of the chamber.

6. The invention of claim 4 wherein said heat absorbing body comprises a metal plate having a substantial surface for absorbing heat from the gas in the chamber.

7. The invention of claim 4 wherein said metal plate includes surface corrugations for increasing its surface area.

8. A method of measuring gaseous pressures comprising the steps of removing heat from a heat absorbing body in the gas being measured at a constant rate so that the heat absorbing body is cooled to a temperature below the temperature of the gas, measuring the temperature of said heat absorbing body as a function of the pressure of the gas surrounding the body.

9. The method of claim 8 wherein the step of cooling said heat absorbing body is effected by maintaining a constant current flow to a thermoelectric cooling device having a cold end connected to said heat absorbing body.

10. A method of measuring the pressure of a gas comprising the steps of positioning a thermoelectric cooling device having a cold surface in the gas, providing electric current to the thermoelectric cooling device to cool the cold surface, varying the electric current to the thermoelectric cooling device to maintain the cold surface at a constant temperature below the temperature of the gas and monitoring the current flowing to the thermoelectric cooling device as a function of the pressure of the gas being measured.

* * * * *